United States Patent
Nagavelli et al.

(10) Patent No.: US 11,913,790 B2
(45) Date of Patent: Feb. 27, 2024

(54) SYSTEM AND METHOD FOR COMMUNICATING DIRECTIONS TO AN ELEVATOR BANK BY A DRONE

(71) Applicant: OTIS ELEVATOR COMPANY, Farmington, CT (US)

(72) Inventors: Vidyasagar Nagavelli, Telangana (IN); Rajendra Prasad Racha, Telangana (IN); Venkata Krishna Surisetty, Telangana (IN); Vinod Akkina, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 2 days.

(21) Appl. No.: 17/751,784

(22) Filed: May 24, 2022

(65) Prior Publication Data
US 2023/0384099 A1 Nov. 30, 2023

(51) Int. Cl.
| | |
|---|---|
| *G01C 21/20* | (2006.01) |
| *B64C 39/02* | (2023.01) |
| *B64D 47/02* | (2006.01) |
| *G08G 5/00* | (2006.01) |
| *B64U 101/00* | (2023.01) |

(52) U.S. Cl.
CPC .......... *G01C 21/206* (2013.01); *B64C 39/024* (2013.01); *B64D 47/02* (2013.01); *G08G 5/0026* (2013.01); *G08G 5/0039* (2013.01); *B64U 2101/00* (2023.01); *B64U 2201/10* (2023.01); *B64U 2201/20* (2023.01)

(58) Field of Classification Search
CPC .. G01C 21/206; B64C 39/024; G08G 5/0026; G08G 5/0039; B64U 2201/10
See application file for complete search history.

(56) References Cited

U.S. PATENT DOCUMENTS

| | | | |
|---|---|---|---|
| 2009/0322562 A1* | 12/2009 | Sachse | G08G 1/096716 340/907 |
| 2014/0160012 A1* | 6/2014 | Su | G06F 3/005 345/156 |
| 2017/0199044 A1 | 7/2017 | Hoareau et al. | |
| 2018/0061235 A1* | 3/2018 | Goldberg | G08G 5/0013 |
| 2021/0088338 A1 | 3/2021 | Ucar et al. | |
| 2021/0179289 A1 | 6/2021 | Tanabe et al. | |

FOREIGN PATENT DOCUMENTS

DE 102020111499 A1 10/2021

OTHER PUBLICATIONS festo.com, "eMotionButterflies," URL: https://www.festo.com/us/en/e/about-festo/research-and-development/bionic-learning-network/highlights-from-2015-to-2017/emotionbutterflies-id_33454/; Retrieved: May 19, 2022; 3 pages.
Extended European Search Report issued in European Application No. 22207819.8 dated Jun. 12, 2023, 9 pages.

* cited by examiner

*Primary Examiner* — Nabil H Syed
*Assistant Examiner* — Cal J Eustaquio
(74) *Attorney, Agent, or Firm* — CANTOR COLBURN LLP

(57) ABSTRACT

Disclosed is a method of communicating directions to an end destination by one or more drones, the method having steps of moving via flying motion by a first drone between a first location and a second location along a travel path therebetween, wherein the second location is the end destination or an intermediate location; and displaying indicia on a first display panel of the drone that is indicative of directions to the second location.

18 Claims, 4 Drawing Sheets

SYSTEM AND METHOD FOR COMMUNICATING DIRECTIONS TO AN ELEVATOR BANK BY A DRONE

BACKGROUND

The embodiments are directed to drones and more specifically to a system and method for communicating directions to an elevator bank by a drone.

Buildings such as multi-level shopping malls may have distributed banks of elevators. Finding the elevator banks may be a challenge. Floor and wall markers may be a challenge to find, e.g., when the building is crowded. This may result in confusion and discomfort.

BRIEF SUMMARY

Disclosed is a method of communicating directions to an end destination by one or more drones, including moving via flying motion by a first drone between a first location and a second location along a travel path therebetween, wherein the second location is the end destination or an intermediate location; and displaying indicia on a first display panel of the drone that is indicative of directions to the second location.

In addition to one or more features of the disclosed method, or as an alternate, the second location is an intermediate location, and the method includes moving via flying motion by a second drone between a third location and the end destination along a travel path therebetween, wherein the second and third locations are the same locations or different locations; and displaying indicia on another display panel of the second drone that is indicative of directions to the end destination.

In addition to one or more features of the disclosed method, or as an alternate, the method further includes displaying first indicia on the first panel and second indicia on a second display panel of the first drone that differs from the first indicia wherein both indicia are indicative the directions to the second location.

In addition to one or more features of the disclosed method, or as an alternate, the method further includes displaying, as the first indicia, directional symbols indicative of directions to the second location; and displaying, as the second indicia, directional text indicative of directions to the second location.

In addition to one or more features of the disclosed method or as an alternate the first drone includes a first wing that is the first display panel and a second wing that is the second display panel; or the first drone is a quadcopter.

In addition to one or more features of the disclosed method, or as an alternative, the method further includes utilizing a radio-navigation system, operationally coupled to the first drone, to track a current location against the first location, the second location, and the travel path therebetween.

In addition to one or more features of the disclosed method, or as an alternate the radio-navigation system is a global positioning system or indoor positioning system.

In addition to one or more features of the disclosed method, or as an alternate, the method further includes communicating with a system controller that is separate from the first drone, utilizing a telecommunications protocol, to receive data representing an update to the first location, the second location, and the travel path therebetween.

In addition to one or more features of the disclosed method, or as an alternate, the method further includes utilizing sensor data, from a sensor operationally coupled to the first drone, for avoiding collisions along the travel path.

In addition to one or more features of the disclosed method, or as an alternate the first and second panels are electronic panels, and the method further includes updating the indicia displayed on the display panels based on whether the first drone is traveling toward or away from the elevator bank, between the first and second locations, so that the indicia on the display panels is substantially continuously indicative of directions to the second location.

Further disclosed is a system for of communicating directions to an end destination, including a first drone; a drone controller operationally coupled to the first drone and configured to control the first drone; a first display panel operationally coupled to the first drone; wherein the first drone is configured to move via flying motion between a first location and a second location along a travel path therebetween, wherein the second location is the end destination or an intermediate location; and displaying indicia on the first display panel of the first drone that is indicative of directions to the second location.

In addition to one or more features of the disclosed system, or as an alternate, the second location is an intermediate location, and the system includes a second drone; a drone controller operationally coupled to the second drone and configured to control the second drone; another display panel operationally coupled to the second drone; wherein the second drone is configured to move via flying motion between a third location and the end destination along a travel path therebetween, wherein the second and third locations are the same locations or different locations; and displaying indicia on the another display panel of the second drone that is indicative of directions to the end destination.

In addition to one or more features of the disclosed system, or as an alternate, the system further includes a second display panel operationally coupled to the first drone, wherein the first drone is further configured to display first indicia on the first panel and second indicia on a second display panel of the first drone that differs from the first indicia wherein both indicia are indicative the directions to the second location.

In addition to one or more features of the disclosed system, or as an alternate, the first drone is further configured to display, as the first indicia, directional symbols indicative of directions to the second location; and display, as the second indicia, directional text indicative of directions to the second location.

In addition to one or more features of the disclosed system, or as an alternate the first drone includes a first wing that is the first display panel and a second wing that is the second display panel; or the first drone is a quadcopter.

In addition to one or more aspects of the disclosed system, or as an alternate the system further includes a radio-navigation system operationally coupled to the first drone, wherein the first drone is configured to utilize the radio-navigation system to track a current location against the first location, the second location, and the travel path therebetween.

In addition to one or more features of the disclosed system, or as an alternate, the radio-navigation system is a global positioning system or indoor positioning system.

In addition to one or more features of the disclosed system, or as an alternate, the system further includes a system controller that is separate from the first drone; wherein the first drone is configured to communicate with the system controller utilizing a telecommunications protocol to receive data representing an update to the first location, the second location, and the travel path therebetween.

In addition to one or more features of the disclosed system, or as an alternate the system further includes a sensor that is operationally coupled to the first drone; wherein the first drone is configured to utilize sensor data, from the sensor, for avoiding collisions along the travel path.

In addition to one or more features of the disclosed system or as an alternate, or as an alternate, the first and second panels are electronic panels, and the first drone is further configured to update the indicia displayed on the display panels based on whether the first drone is traveling toward or away from the second location, between the first and second locations, so that the indicia on the display panels is substantially continuously indicative of directions to the second location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
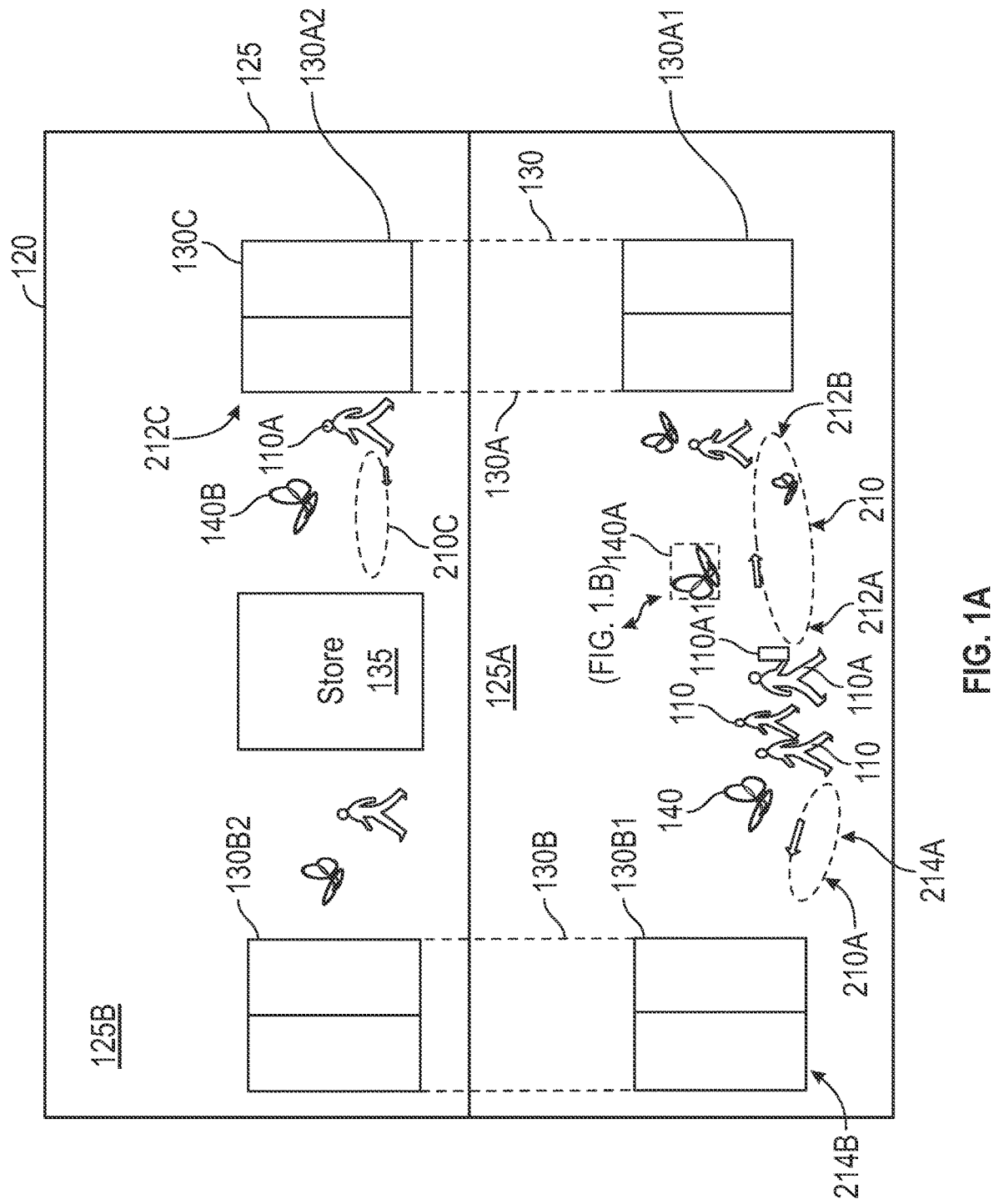
FIG. 1A shows a system that may be utilized for communicating directions to an end destination by a drone.

Turning to FIG. 1A, various people 110 may be in a building 120 with multiple levels generally referenced as 125, including first and second levels 125A, 125B, such as an indoor shopping center, auditorium or high-rise apartment complex. The building 120 may have multiple elevator banks generally referenced as 130 including a first elevator bank 130A having landings on the first and second floors 130A1, 130A2 and a second elevator bank 130B having landings on the first and second floors 130B1, 130B2. To help the people generally referenced as 110 in the building 120 locate the elevator banks 130, or perhaps a specific end destinations 135 such as a store, the building 120 may be equipped with drones generally referenced as 140 otherwise known as unmanned anal vehicles (UAV). Utilizing drones 140 in this way, the people 110 may feel more comfortable walking through the building 120. This could be especially helpful for people 110 who are visiting the building 120 for the first time or in a circumstance in which the building is crowded or large enough so that finding an elevator bank 130 may present a challenge.

Figure 1B:
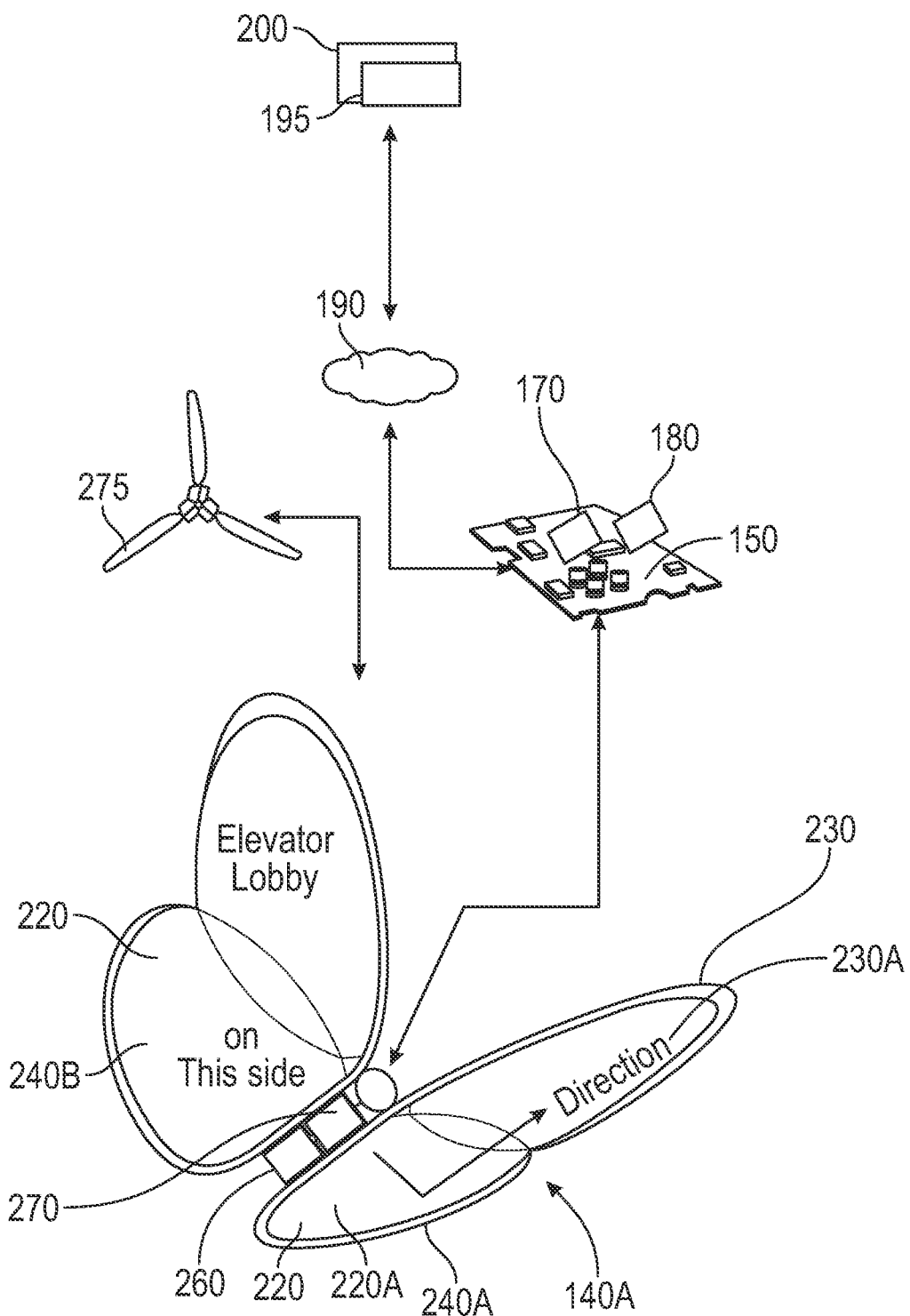
FIG. 1B shows a drone that may be utilized in the system of FIG. 1A.

A non-limiting example a first drone 140A is shown FIG. 1B, which is a typical one of the drones 140. A drone controller 150 having at least one processor 155 is operationally coupled to the first drone 140, and may be onboard the first drone 140A. A sensor 170 and communications module 180 may be operationally coupled to the drone controller 150. The sensor 170 may be a visual senor or may be RADAR or LIDAR, for example, which may be utilized for detecting a location of the first drone 140A and to sense crowd density and for collision avoidance. The communications module 180 may provide the first drone 140A with the ability to communicate utilizing one or more wireless network telecommunication protocols, including local and personal area network protocols, to communicate over a wireless network 190. Such communications may be with a remotely located system controller 195, which may be in the building 120 or may be part of a cloud service 200. The drone controller 150 may be able to determine its location in the building 120 via a radio-navigation system such as a global positioning system (GPS) or an indoor positioning system (IPS). An IPS may utilize local and personal area network connections utilizing relays and beacons affixed to storefronts, elevator banks and other defined locations within the building 120.

With reference to FIGS. 1A and 1B, by communicating with the system controller 195, the first drone 140A may learn its travel path 210, e.g., between first and second locations (or endpoints) 212A, 212B, and/or receive updates to its travel path so that it travels along a different travel path 210A with different endpoints 214A, 214B. Updates to the travel path 210, 210A may occur based on a crowd density as determined by the system controller 195, a time of day, sensor data from the drone sensor 170, an operational status of the elevator banks 130, or other factors. Alternatively, the travel paths 210, 210A, may be stored as a list, such as look-up tables, within memory the drone controller 150. It is to be appreciated that in certain embodiments or operational modes the first drone 140A may function autonomously and in other embodiments or operational modes it may function via communications with, and control by, the system controller 195.

Turning back to FIG. 1B, the first drone 140A may include one or more display panels generally referred to as 220 including for example a first display panel 220A and a second display panel 220B. The display panels 220 may be fabric with indicia generally referenced as 230 disposed on the panels 220 to convey information indicative of a direction of travel, e.g., via a first person 110A (FIG. 1A) walking, to a first elevator bank 130A (FIG. 1A). Thus first indicia 230A may be on the first panel 220A and second indicia 230B may be on the second panel 220B. The indicia 230 on each panel may be the same as each other but it may be different. For example, the first indicia 230A may include symbols indicative of a direction to the first elevator bank 130A and the second indicia 230B may include text. The symbols may include a directional arrow while the text may indicate "elevator lobby" and "this way" or "on this side". A mixture of text and symbols for both indicia is within the scope of the embodiments.

In an embodiment, the panels 220 may be electronic, such as LCD or LED panels that are operationally coupled to the drone controller 150 by wired or wireless connections identified herein, or the drone controller 150 may be integral to one or more of the panels 220. The panels 220, if electronic, may be configured to display the indicia 230, and may be configured to update the indicia 230 from operation of the drone controller 150. The information on the display may provide directions to the first elevator bank 130A as indicated. It is to be appreciated that the first drone 140A can be utilized for other directional purposes, such as to identify directions to escalators, exits, food courts, restrooms, parking, and other locations in and around a building. The first drone 140A can also be utilized to display advertisements along with, or instead of, the directional information, e.g., for intermittent or prolonged periods of time while in operation. The advertisements may change as the first drone 140A determines it is closer to different stores in a shopping mall, as one example.

As shown, the first drone 140A may be an animal and more specifically a winged animal such as an insect, and more specifically a butterfly. The panels 220 may be wings generally referenced as 240 of the first drone 140A and may execute a flapping motion to provide lift to the first drone 140A. That is, the first drone 140A may include a first wing 240A that is the first display panel 220 and a second wing 240B that is the second display panel 220. The wings 240 may be driven by an onboard motor 260 that is power by a power source 270 such as a battery.

The size of the first drone 140A may be larger or smaller than the animal it is representing. For the butterfly shaped drones 140, the first drone 140A may be large enough so that the panels 220 are clearly visible to an average person from a distance of a few feet, up to, for example, five to twenty feet.

Alternatively, another propulsion system 275 can enable the first drone 140A to move via flying, such as one or more lifting fans driven by the onboard motor 260. Lifting fans may be utilized in a configuration where the drone is, e.g., a quadcopter. In a configuration in which the first drone 140A is a quadcopter, the panels 220 may be screens supported by it.

The drones 140 may communicate with each other to provide directions or other information to a first person 110A. For example the first person 110A may be traveling from the first floor 125A to a store 135 on the second floor 125B. The first drone 140A may guide the first person 110A to the first floor elevator landing 130A1 and a second drone 140B may guide the first person 110A from the second floor elevator landing 130A2 to the store 135. This handoff may occur via the system controller 195 or via the drones 140 autonomously communicating among each other. In such instance, the drones 140 may determine which of the drones 140 will be involved in the handoff based on, e.g., telecommunication network configurations (e.g., utilizing subnets or pairing over personal area networks, as nonlimiting examples) or relative distances from traveling points. The drones 140 or system controller 195 may become informed of an end destination, such as the store 135, for the first person 110A based on a software application on the person's 110A smart device 110A1 (e.g., mobile phone as a nonlimiting example). That is, the smart device 110A1 may be operationally connected to the network 190 within the building or paired with one of the drones 140 over a personal area network, for example. Other options for entering the end destination could include voice commands or texting via a smart device.

Regardless of the utilization, the drones 140 on each level may travel a closed loop path in order to return to a common starting point on the respective level. This way the drones 140 may be ready for additional operational functions as may be preprogramed or determined by the system controller 195. Alternatively, certain ones of the drones 140 may continuously travel in a closed loop for an extended period (minutes, hours) to provide a single message or set of messages to people 110, such as directions to an elevator bank or store advertisements, etc.

In an additional embodiment the propulsions system may be used as the panel 220 to display the message. For example the wings 240 may be used directly to display a message. In additional embodiment where the propulsion system is a rotating body, such as a quadcopter, the rotating body may use synchronized LEDs or other mechanisms synchronized with the rotation as a panel 220 to display a message.

Figure 2A:
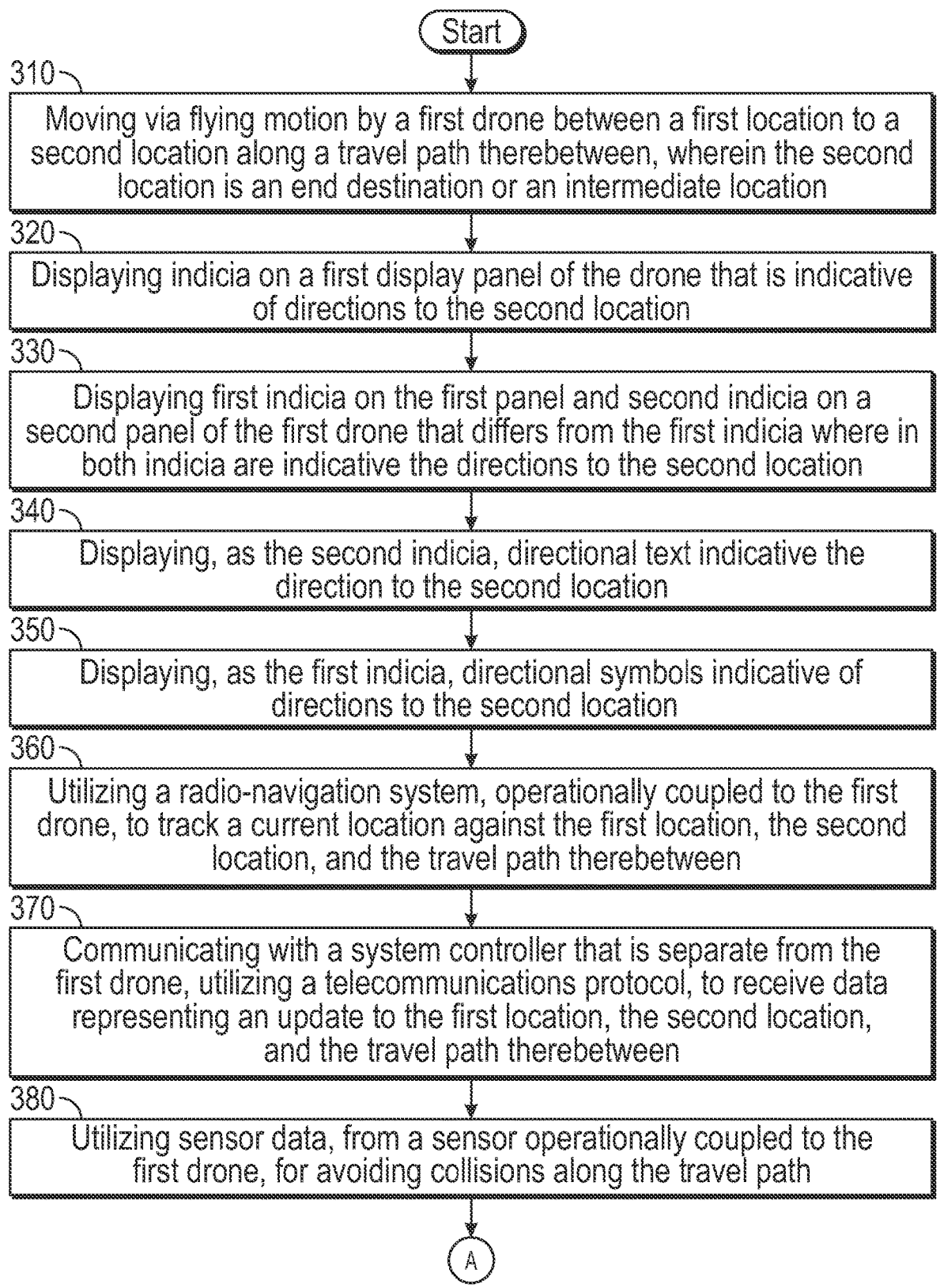
FIGS. 2A and 2B, together, show a flowchart showing a method of communicating directions to an elevator bank by a drone.
Figure 2B:
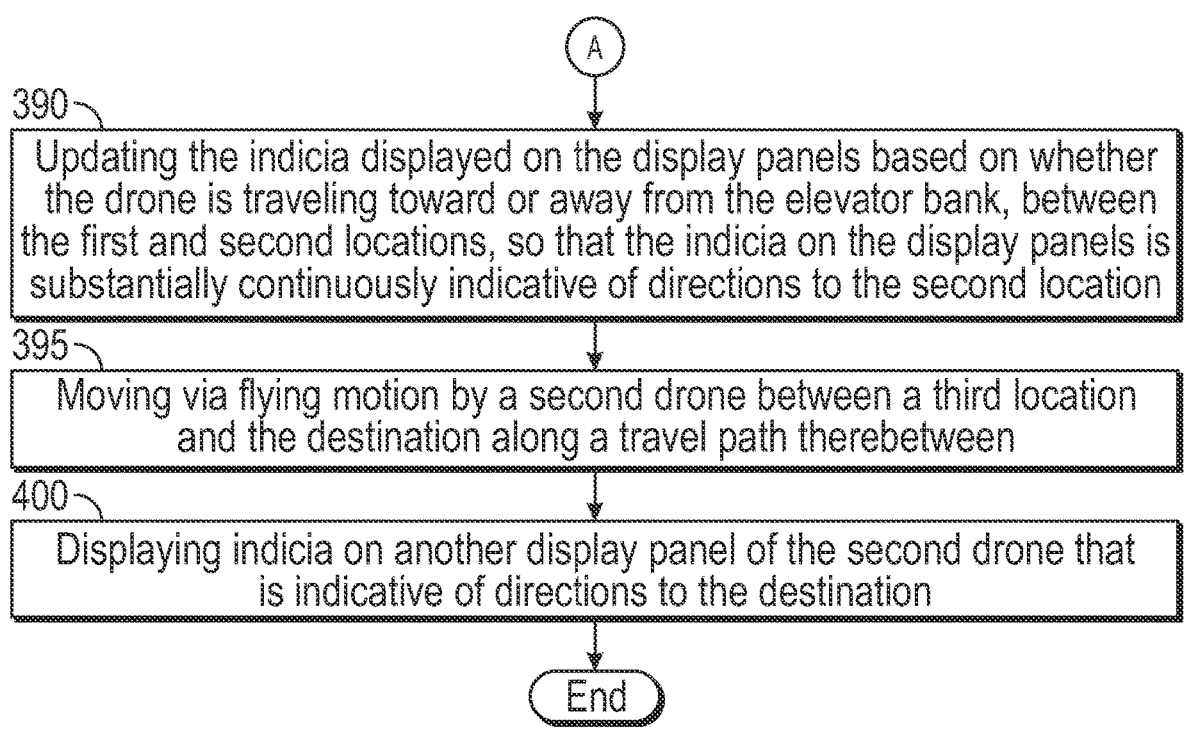

Turning to FIGS. 2A and 2B, a flowchart shows a method of communicating directions to an end destination 135 by the one or more drones 140. As shown in block 310, the method may include moving via flying motion by the first drone 140A, which may a typical one of the drones 140, between a first location 212A and a second location 212B along a travel path 210 therebetween. As indicated, the second location 212B is an end destination 135 such as a store 135 or an intermediate location such as an elevator bank 130 which has been selected by the system controller 195 The endpoints (e.g., the first and second locations 212A, 212B) and the travel path 210 may be selected to optimize a flow of foot traffic along a corridor or an open space in the building 120. As indicated, the selected path may account for time of day, crowed density, type of building (mall, office building), etc.

As shown in block 320, the method may further include displaying indicia 230 on the first display panel 220 of the first drone 140A that is indicative of directions to the second location 212B. Thus, when a person 110A looks toward the first drone 140, the person 110A can be guided by the indicia 230 toward the second location 212B.

As shown in block 330, the method may further include displaying first indicia 230A on the first panel 220 and second indicia 230B on a second panel 220B of the first drone 140A. The second indicia 230B may differ from the first indicia 230A. Both indicia 230A, 230B, may be indicative the directions to the second location 212B. For example, as shown in block 340, the method may further include displaying, as the first indicia 230A, directional symbols indicative the direction to the elevator bank 130. As shown in block 350, the method may further include displaying, as the second indicia 230B, directional text indicative of directions to the elevator bank 130. More specifically, in one non-limiting example, the first indicia 230A may state "elevator bank on this side" and the second indicia 230B may be an arrow. The second indicia 230B may include text as well, such as the word "direction" next to the arrow. This, however, is a non-limiting example of the type of directional information which may be displayed via the drone 140.

As shown in block 360, the method may further include utilizing the radio-navigation system, operationally coupled to the first drone 140A, to track a current location against the first location 212A, the second location 212B, and the travel path 210 therebetween. As indicated, the radio-navigation system may be a global positioning system or indoor positioning system. Thus, the first drone 140A may be able to travel to the travel path 210 at the start of service and may course correct while in flight if it veers off the travel path. Alternatively, the system controller 195, utilizing sensors distributed through the building, may track the first drone 140A and control its travel pattern and endpoints.

As shown in block 370, the method may further include communicating with the system controller 195 that is separate from the first drone 140A, utilizing a telecommunications protocol. Through this communication, the first drone 140A may receive data representing an update to the first location 214A, the second location 214B, and the travel path 210A therebetween. As indicated, the update may be triggered by a crowd density, a time of day, or other factor, such as an elevator bank 130 being put out of service.

As shown in block 380, the method may further include utilizing sensor data, from the sensor 170 operationally coupled to the first drone 140A, for avoiding collisions along the travel path 210. For example, people, structures and other drones 150 may be in the travel path 210 during a service period for the first drone 140A.

As indicated, the first panel 220 and second panel 220 may be electronic panels, such as LED or LCD panels. As shown in block 390, the method may further include the first drone 140A changing the indicia displayed on the display panels 220 based on whether the first drone 140A is traveling toward or away from the elevator bank 130, e.g., when traveling between the first and second locations 212A, 212B. This way, the indicia 230 on the display panels 220 may be substantially continuously indicative of directions to the elevator bank 130, regardless of a direction that the first drone 140A is facing.

In one embodiment, the second location 212B is an intermediate location, and as shown in block 395 the method includes moving via flying motion by a second drone 140B between a third location 212C and the end destination, e.g., the store 135 along a travel path 210C therebetween. The second and third locations 212B, 212C may be the same locations or different locations. For example, if the end destination 135 is on the same level as the first location 212A, and the first drone 140A had a limited range, the second drone 140B could be utilized on the same level to direct the person 110A to the end destination 135. Thus, in such situation, the handoff between drones 140A, 140B could be at a common location. Alternatively, as illustrated, the second location 212B may be a first floor elevator landing 130A1 and the third location 212C may be on a separate level, at a second floor elevator landing 130A2. As shown in block 400, the method includes displaying indicia on another display panel of the second drone 140B (e.g., the equivalent of panel 220 of the first drone 140A) is that is indicative of directions to the end destination 135 from the third location 212C along the travel path 210C. This is similar to the operation of the first drone 140A between the first and second locations 212A, 232B.

Figure 3:
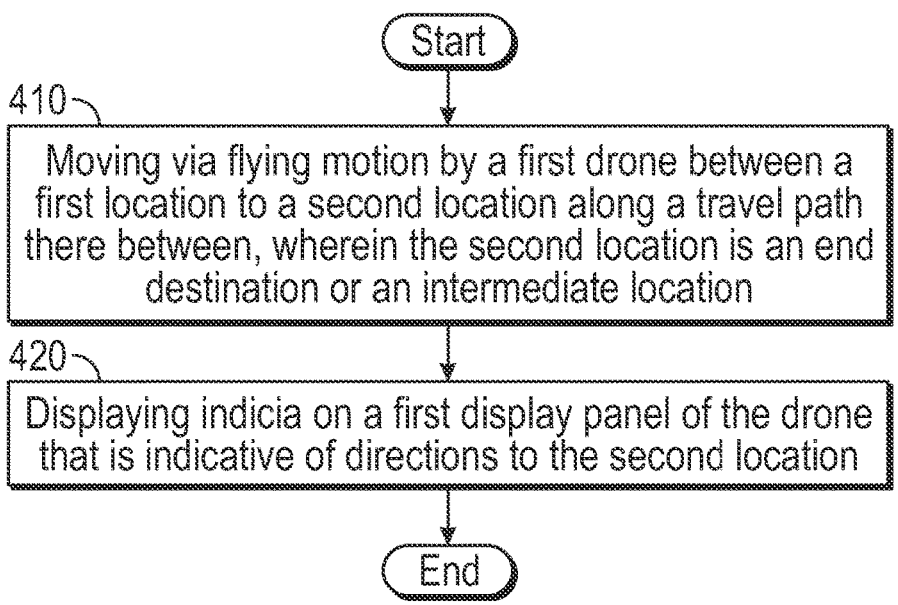
FIG. 3 is another flowchart showing a method of communicating directions to an elevator bank by a drone.

Turning to FIG. 3, another flowchart shows certain aspects of the method of communicating directions to an elevator bank by a drone 140. As shown in block 410, the method may include moving via flying motion by the first drone 140A between the first location 212A and the second location 212B along the travel path 210 therebetween. As indicated, the second location 212B is an end destination 135 or an intermediate location. As shown in block 420, the method may further include displaying indicia 230 on the first display panel of the drone 140 that is indicative of directions to the second location 21B.

Thus, the above embodiments provide a system and method for guiding people toward an elevator bank 130 in a building 120 utilizing a drone 140. The embodiment may enable people unfamiliar with a building layout to easily navigate the building. In a shopping mall, this would result in an enhanced experience for shoppers seeking to travel between floors. As indicated, the drone 140 can be utilized for other directional purposes, such as to identify directions to escalators, exits, food courts, restrooms, parking, and other locations in and around a building. The drone 140 can also be utilized to display advertisements along with, or instead of, the directional information, e.g., for intermittent or prolonged periods of time while in operation. Additionally, with the use of personal smart devices such as phones, the drone 140 may pair with and be assigned to individuals and may remain in close proximity to such individuals while walking through the building to provide directions, advertisements and other information relevant to the individuals and, e.g., building merchants. Thus, as can be appreciated, the embodiments provide an enhanced experience for people and business within buildings.

Sensor data identified herein may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller identified above may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of communicating directions to an end destination within a building by one or more drones, comprising:
moving via flying motion by a first drone between a first location and a second location that differ from each other on a first floor of the building, along a travel path therebetween, wherein the second location is the end destination or an intermediate location, and wherein the second location is an elevator landing on the first floor of an elevator bank within the building; and displaying indicia on a first electronic display panel of the drone that is indicative of directions to the second location;

updating, by a drone controller of the first drone, the indicia displayed on the display panel based on whether the first drone is traveling toward or away from the elevator bank, between the first and second locations, so that the indicia on the display panel is substantially continuously indicative of directions to the second location; and utilizing a radio-navigation system, operationally coupled to the first drone, to track a current location against the first location, the second location, and the travel path therebetween, wherein the radio-navigation system is an indoor positioning system.

2. The method of claim 1, wherein
the second location is an intermediate location, and the method includes:

moving via flying motion by a second drone on a second floor of the building, between a third location and the end destination along a travel path therebetween, wherein the third locations is an elevator landing on the second floor of the elevator bank; and displaying indicia on another display panel of the second drone that is indicative of directions to the end destination.

3. The method of claim 1, further comprising
displaying first indicia on the first panel and second indicia on a second display panel of the first drone that differs from the first indicia wherein both indicia are indicative the directions to the second location.

4. The method of claim 3, further comprising:
displaying, as the first indicia, directional symbols indicative of directions to the second location; and
displaying, as the second indicia, directional text indicative of directions to the second location.

5. The method of claim 4, wherein:
the first drone includes a first wing that is the first display panel and a second wing that is the second display panel; or
the first drone is a quadcopter.

6. The method of claim 1, further comprising:
communicating with a system controller that is separate from the first drone, utilizing a telecommunications protocol, to receive data representing an update to the first location, the second location, and the travel path therebetween.

7. The method of claim 1, further comprising:
utilizing sensor data, from a sensor operationally coupled to the first drone, for avoiding collisions along the travel path.

8. The method of claim 3, wherein:
the first and second panels are electronic panels, and the method further includes: updating the indicia displayed on the display panels based on whether the first drone is traveling toward or away from the elevator bank, between the first and second locations, so that the indicia on the display panels is substantially continuously indicative of directions to the second location.

9. A system for of communicating directions to an end destination within a building, the system comprising:
a first drone;
a drone controller operationally coupled to the first drone and configured to control the first drone;
a first electronic display panel operationally coupled to the first drone;

wherein the first drone is configured to:
move via flying motion by a first drone between a first location and a second location that differ from each other on a first floor of the building, along a travel path therebetween, wherein the second location is the end destination or an intermediate location, and wherein the second location is an elevator landing on the first floor of an elevator bank within the building; and display indicia on the first electronic display panel of the first drone that is indicative of directions to the second location;

update, by the drone controller of the first drone, the indicia displayed on the display panel based on whether the first drone is traveling toward or away from the elevator bank, between the first and second locations, so that the indicia on the display panel is substantially continuously indicative of directions to the second location; and utilize a radio-navigation system, operationally coupled to the first drone, to track a current location against the first location, the second location, and the travel path therebetween, wherein the radio-navigation system is an indoor positioning system.

10. The system of claim 9, wherein
the second location is an intermediate location, and the system includes:
a second drone;
a drone controller operationally coupled to the second drone and configured to control the second drone;
another display panel operationally coupled to the second drone;
wherein the second drone is configured to:
move via flying motion by a second drone on a second floor of the building, between a third location and the end destination along a travel path therebetween, wherein the third locations is an elevator landing on the second floor of the elevator bank; and displaying indicia on the another display panel of the second drone that is indicative of directions to the end destination.

11. The system of claim 9, further comprising
a second display panel operationally coupled to the first drone,
wherein the first drone is further configured to:
display first indicia on the first panel and second indicia on a second display panel of the first drone that differs from the first indicia wherein both indicia are indicative the directions to the second location.

12. The system of claim 11, wherein
the first drone is further configured to:
display, as the first indicia, directional symbols indicative of directions to the second location; and
display, as the second indicia, directional text indicative of directions to the second location.

13. The system of claim 12, wherein:
the first drone includes a first wing that is the first display panel and a second wing that is the second display panel; or
the first drone is a quadcopter.

14. The system of claim 9, further comprising:
a system controller that is separate from the first drone;
wherein the first drone is configured to
communicate with the system controller utilizing a telecommunications protocol to receive data representing an update to the first location, the second location, and the travel path therebetween.

15. The system of claim 9, further comprising:
a sensor that is operationally coupled to the first drone;
wherein the first drone is configured to
utilize sensor data, from the sensor, for avoiding collisions along the travel path.

16. The system of claim 11, wherein:
the first and second panels are electronic panels, and
the first drone is further configured to:
update the indicia displayed on the display panels based on whether the first drone is traveling toward or away from the second location, between the first and second locations, so that the indicia on the display panels is substantially continuously indicative of directions to the second location.

17. The method of claim 6, wherein the building includes a plurality of elevator banks within the building having landings on the first and second floors, and the elevator bank is selected by the system controller is based on one or more of crowd density, time of day, and an operational status of the elevator banks.

18. The system of claim 14, wherein the building includes a plurality of elevator banks within the building having landings on the first and second floors, and the elevator bank is selected by the system controller is based on one or more of crowd density, time of day, and an operational status of the elevator banks.

* * * * *